(12) United States Patent
Freeze-Skret et al.

(10) Patent No.: US 12,335,408 B2
(45) Date of Patent: Jun. 17, 2025

(54) METHOD OF SECURING LEGACY ANALOG SENSOR CIRCUITS USED IN PHYSICAL SECURITY, PREMISE ACCESS CONTROL AND INDUSTRIAL SCADA APPLICATIONS

(71) Applicant: Prometheus Security Group Global, Austin, TX (US)

(72) Inventors: Jeremy Freeze-Skret, Dripping Springs, TX (US); Daniel Skret, Dripping Springs, TX (US)

(73) Assignee: Prometheus Security Group Global, Austin, TX (US)

( * ) Notice: Subject to any disclaimer, the term of this patent is extended or adjusted under 35 U.S.C. 154(b) by 240 days.

(21) Appl. No.: 17/355,818

(22) Filed: Jun. 23, 2021

(65) Prior Publication Data

US 2022/0021545 A1  Jan. 20, 2022

Related U.S. Application Data

(60) Provisional application No. 63/042,826, filed on Jun. 23, 2020.

(51) Int. Cl.
| | | |
|---|---|---|
| G06F 21/00 | (2013.01) |
| G06F 12/14 | (2006.01) |
| G06F 21/86 | (2013.01) |
| H04L 9/08 | (2006.01) |
| H04L 9/32 | (2006.01) |
| H04L 29/06 | (2006.01) |

(52) U.S. Cl.
CPC ........ *H04L 9/3252* (2013.01); *G06F 12/1458* (2013.01); *G06F 21/86* (2013.01); *H04L 9/0825* (2013.01); *H04L 9/0891* (2013.01); *H04L 9/3242* (2013.01)

(58) Field of Classification Search
CPC ... H04L 9/3252; H04L 9/0825; H04L 9/0891; H04L 9/3242; H04L 2209/805; G06F 12/1458; G06F 21/86; G06F 12/1408; G06F 12/1433; G06F 21/602; G06F 21/85; Y04S 40/20
See application file for complete search history.

(56) References Cited

U.S. PATENT DOCUMENTS

2003/0172289 A1\* 9/2003 Soppera ............... H04L 63/1458
726/13
2007/0242757 A1\* 10/2007 Schley-May ....... H04L 25/4915
375/257

(Continued)

*Primary Examiner* — Lisa C Lewis

(57) ABSTRACT

Embodiments are directed to an apparatus, comprising: a microcontroller configured as a Universal Field Panel. The microcontroller provides channels that (i) couple to a digital encrypted security interface (DESI) via a digital communications interface and/or couple to a sensor comprising an analog signal, and wherein the analog sensor comprises one or more resistors coupled with one or more switches to monitor Boolean status from sensors (ii) wherein the digital encrypted security interface (DESI) couples to a sensor input and/or couples to a control output where signals to command a relay are authenticated prior to execution, (iii) authenticate and encrypt the sensor or control output. The control output is a programmable relay or solid-state device that features a Form-C control interface for providing authentication from command-and-control platforms to the devices and/or signals they are controlling.

6 Claims, 9 Drawing Sheets

(56) References Cited

U.S. PATENT DOCUMENTS

| | | | |
|---|---|---|---|
| 2009/0167269 A1* | 7/2009 | Zhao | H02M 3/1582 |
| | | | 323/282 |
| 2011/0316560 A1 | 12/2011 | Gregg et al. | |
| 2012/0131673 A1 | 5/2012 | Caci | |
| 2016/0105288 A1* | 4/2016 | Logue | G06F 21/33 |
| | | | 713/156 |
| 2019/0368227 A1 | 12/2019 | Tabib et al. | |
| 2020/0145425 A1 | 5/2020 | Chauhan et al. | |
| 2020/0162269 A1 | 5/2020 | Nix | |
| 2021/0294954 A1* | 9/2021 | Kia | G06N 7/08 |
| 2021/0361940 A1* | 11/2021 | Yeh | H01G 4/35 |
| 2022/0312561 A1* | 9/2022 | Bruvier | H05B 45/345 |

* cited by examiner

METHOD OF SECURING LEGACY ANALOG SENSOR CIRCUITS USED IN PHYSICAL SECURITY, PREMISE ACCESS CONTROL AND INDUSTRIAL SCADA APPLICATIONS

PRIORITY

This application claims priority to U.S. Provisional Patent Application Ser. No. 63/042,826 filed Jun. 23, 2020, which is incorporated herein by reference its entirety.

BACKGROUND

Certain embodiments relate to the field of monitoring systems and devices. Certain aspects are directed to encrypted and authenticated monitoring of passive sensors using the existing wiring infrastructure.

The current state-of-the-art of Intrusion Detection Systems (IDS) and Physical Access Control Systems (PACS) leaves a lot to be desired. Critical system data is often transmitted in the clear or with minimal protection against replay attacks. System configuration data and event logs are unauthenticated and subject to insider manipulation. Most Boolean intrusion sensors (door switches, push-to-exit buttons, motion detectors, etc.) are wired back to the host using 1940's supervised line techniques that are easily defeated. Deployed equipment is seldom accurately accounted for beyond initial installation, making ongoing threat mitigation and vulnerability exposure a serious concern. Deployed equipment is not uniquely identified or authenticated, especially at the edge where more processing power exists today. Additionally, command and control systems commands to control outputs (such as door locking mechanisms for access control) are not authenticated and are only protected by the conduit carrying the control wires.

A typical system is comprised of various "levels" of infrastructure. At the top are multiple site servers that perform site management, logging, analysis, and operator display. They often report and inter-operate with enterprise-wide systems that are remotely located. In the middle are the control processors that implement the IDS/PACS mission. These are often called "field panels". At the edge are the various sensors and controls that touch the environment. The current systems are vulnerable and there is a need to devise more secure systems.

SUMMARY

Certain embodiments are directed to an authenticator to tailor the base DS28E83 module's characteristics to better suit the security applications that it will be provided for. Primarily this will provide asymmetric public key cryptography for: Encryption of the information carried through the device; and/or Digital Signature Authentication of all devices in the chain (end of line to head end) generating security information. This will mean changes to the existing device in key management posture, a re-mapping of the memory space, implementation of a latching mechanism to catch fast GPI changes, implementation of tamper monitoring logic and response and creation of fast authenticated writes. The device will implement an external (to the DS28E83 module) programmable watchdog timer monitoring encrypted communications with a reset to default state in the event of loss of communication to the control system.

Certain embodiments are directed to an apparatus, comprising: a microcontroller configured as a Universal Field Panel, wherein the microcontroller is configured to provide channels that (i) couple to at least one digital encrypted security interface (DESI) via a digital communications interface (e.g., a one-wire, carrier current, HART, etc.) and/or couple to at least one sensor comprises an analog signal, and wherein the analog sensor comprises one or more resistors coupled with one or more switches to monitor Boolean status from sensors (such as shown in the configuration of FIG. 3) (ii) wherein the digital encrypted security interface (DESI) couples to at least one sensor input and/or couples to a control output where signals to command a relay are authenticated prior to execution. (iii) authenticate and encrypt the at least one sensor or control output. In certain aspects, the at least one sensor is a digital sensor, and wherein the digital sensor comprises: a digital sensor module configured to receive one or more of a Boolean signal, an alarm signal, and/or a tamper signal, wherein the digital communications interface corresponding to the digital sensor comprises a ground reference signal and a data signal. In a further aspect, the at least one sensor comprises an analog signal, and wherein the analog sensor comprises one or more resistors coupled with one or more switches to monitor Boolean status from sensors or control outputs. In a further aspect the at least one control output is a means of controlling power or state signaling.

The microcontroller can be configured to authenticate and encrypt the at least one sensor and/or control output using a public key cryptography digital signature authentication mechanism and a public key cryptography encryption algorithm. In certain aspects, the public key cryptography digital signature authentication mechanism is Elliptic Curve Digital Signature Algorithm (ECDSA). In a further aspect, the public key cryptography encryption algorithm is Hash-based Message Authentication Code (HMAC).

The microcontroller can be configured to authenticate and encrypt the at least one sensor and/or control output based, at least in part, on an address of the sensor and a location of the sensor. The apparatus can further include a power module coupled to the Universal Field Panel devices (such as shown in the configuration of FIG. 5).

Certain embodiments are directed to a system, comprising: (i) a plurality of authenticated sensors and/or control outputs, each authenticated node comprising a digital encrypted security interface (DESI) module and a plurality of sensor monitoring inputs or control outputs; (such as shown in the configuration of FIG. 6) (ii) a plurality of Universal Field Panels coupled to a plurality of authenticated sensors and/or control outputs (such as shown in the configuration of FIG. 1); and (iii) a plurality of input/output controllers coupled to a plurality of sensors and/or control outputs (such as shown in the configuration of FIG. 2). In certain aspects, the system can include a first Universal Field Panel coupled to a first set of the plurality of authenticated sensors and/or control outputs; a second Universal Field Panel coupled to a second set of the plurality of authenticated sensors and/or control outputs; a third Universal Field Panel coupled to a third set of the plurality of authenticated sensors and/or control outputs; a fourth Universal Field Panel coupled to a fourth set of the plurality of authenticated sensors and/or control outputs; a first area input/output controller coupled to the first Universal Field Panel and the second Universal Field Panel; and a second area input/output controller coupled to the third Universal Field Panel and the fourth Universal Field Panel. In certain aspects, sensor monitoring inputs or control outputs can include inputs from one or more Boolean sensor(s) or control outputs from devices that need power or signaling and can be done as a FORM C implementation using a standard relay or solid state relay (such as shown in the configuration of FIG. 7).

The system can further comprise a plurality of servers coupled to a plurality of area controllers, coupled to a plurality of input/output controllers and coupled to a plurality of authenticated sensors and/or control outputs and/or analog sensors. In certain aspects, each area input/output controller is configured to communicate with the server using public key cryptography or session encryption keys. In a further aspect, the server is configured to authenticate and encrypt information from at least one sensor controller within the plurality of sensor controllers, which in turn is configured to authenticate and encrypt information from at least one digital sensor within the plurality of digital encrypted security interfaces (DESIs). The first area input/output controller can be configured to communicate with the first Universal Field Panel through a variety of communication mediums (such as shown in the configuration of FIG. 2). In certain aspects, the communication medium includes, but is not limited to an RS-485 bus, an Ethernet network, or the like. In certain aspects, at least one of the plurality of authenticated sensors and/or control outputs comprises a digital encrypted security interface (DESI) module configured to receive a Boolean sensor status, The Boolean sensor status can include, but is not limited to an alarm signal and/or a tamper signal. In certain aspects, each Universal Field Panel is configured to communicate with the at least one of the plurality of authenticated sensors and/or control outputs through a digital communications interface. The digital encrypted security interface (DESI) module can have a unique identifier to allow module authenticity and multi-manufacturer interoperability. The Universal Field Panel inputs can be capable of monitoring either digitally authenticated inputs or analog inputs. The digital encrypted security interface (DESI) module can be configured to latch input transitions on either the rising or falling edge of the signal for subsequent read out by the Universal Field Panel. The digital encrypted security interface (DESI) module can be configured to support the ability to rekey the public key cryptography information of the device over the life of the device. The system can further include a power module coupled to any of the Universal Field Panels.

An apparatus or system can include the output controller interfaced to provide a Form C control through an external relay or solid state, wherein the Form C control provides known and default control states. The apparatus or the system includes a device that supports a mode of fast encrypted writes to provide adequate timing for controlling of output devices. The device implements a watchdog timer that monitors for encrypted communications from the Universal Field Panel and if these do not occur detects bus tampering and reverts to default state while latching a tamper status. The device provides random data to the memory locations where status is read protecting the device from external pattern snooping attacks. The last random data read is used to authenticate the fast encrypted writes for controlling outputs. The device provides a constant current source and shunt regulator to enable long line digital communications. The device supports programmable key slots for changing root keying material over the life of the device. These slots can be protected with authenticated writes using the prior slot material to prevent surreptitious changing for forced take over attacks. When in analog mode the device provides a novel approach to measuring these circuits which features a constant current source. This offers wider range of noise immunity as well as supervision resistor combinations. The Universal Field Panels will auto range through the external circuit and adjust the configuration to adapt to measured responses and the deployed environment. When deployed with (2) UFP-GW the system can redundantly fail over between the plurality of expansion modules and DESI modules that would be deployed underneath for fault tolerance and control redundancy (such as shown in the configuration of FIG. 2).

The apparatus or system can be configured so that clearing of the latch is controlled by an encrypted read of the device which requires passing the authentication test so that status cannot be surreptitiously cleared. The apparatus or system can be configured to provide open mode of re-keying and authenticated rekeying so that it cannot be taken over surreptitiously. The apparatus or system can provide intrinsic tamper detection and response mechanism to count failed re-key attempts and alert the host system. The apparatus can enforce a watchdog timer that monitors for communications by the host controller and if these do not happen within the timeout revert the control output to the default state to protect against surreptitious attempts to sever the link to the controller and force control of the apparatus locally. The apparatus uses the random number generator to fill the remaining memory bytes with constantly rotating random data so that pattern studying techniques are obscured. The apparatus can have a form factor that is miniaturized to allow for installation in existing sensor technologies. The system/device/apparatus can be configured to meet various encryption and data validation standards, e.g. United States Government standards. To allow for conversion from legacy infrastructure to digital encrypted security enhanced infrastructure the apparatus can be configured on a per input basis to accept analog or digital sensors (such as shown in the configuration of FIG. 5). When in analog mode the device provides a novel approach to measuring these circuits which features a constant current source. This offers wider range of noise immunity as well as supervision resistor combinations. The Universal Field Panels will auto range through the external circuit and adjust the configuration to adapt to measured responses and the deployed environment.

An analog sensor is an electronic device that is constantly measuring a physical variable. For example: temperature, distance, humidity, light, etc. And then transforms the physic variable in an electric signal. An actuator is an electronic device that transforms an electric signal in a physic variable (light, sound, etc.). An analog sensor measures continuously the variable and detects any proportional value between 100% and 0%.

The term SCADA refers to Supervisory control and data acquisition (SCADA), which is a control system architecture comprising computers, networked data communications and graphical user interfaces (GUI) for high-level process supervisory management, while also comprising other peripheral devices like programmable logic controllers (PLC) and discrete proportional-integral-derivative (PID) controllers to interface with process plant or machinery.

Other embodiments are discussed throughout this application. Any embodiment discussed with respect to one aspect applies to other aspects as well and vice versa. Each embodiment described herein is understood to be embodiments that are applicable to all aspects of the invention. It is contemplated that any embodiment discussed herein can be implemented with respect to any method or composition of the invention, and vice versa. Furthermore, software and/or firmware encoded programs can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DESCRIPTION

Figure 1:
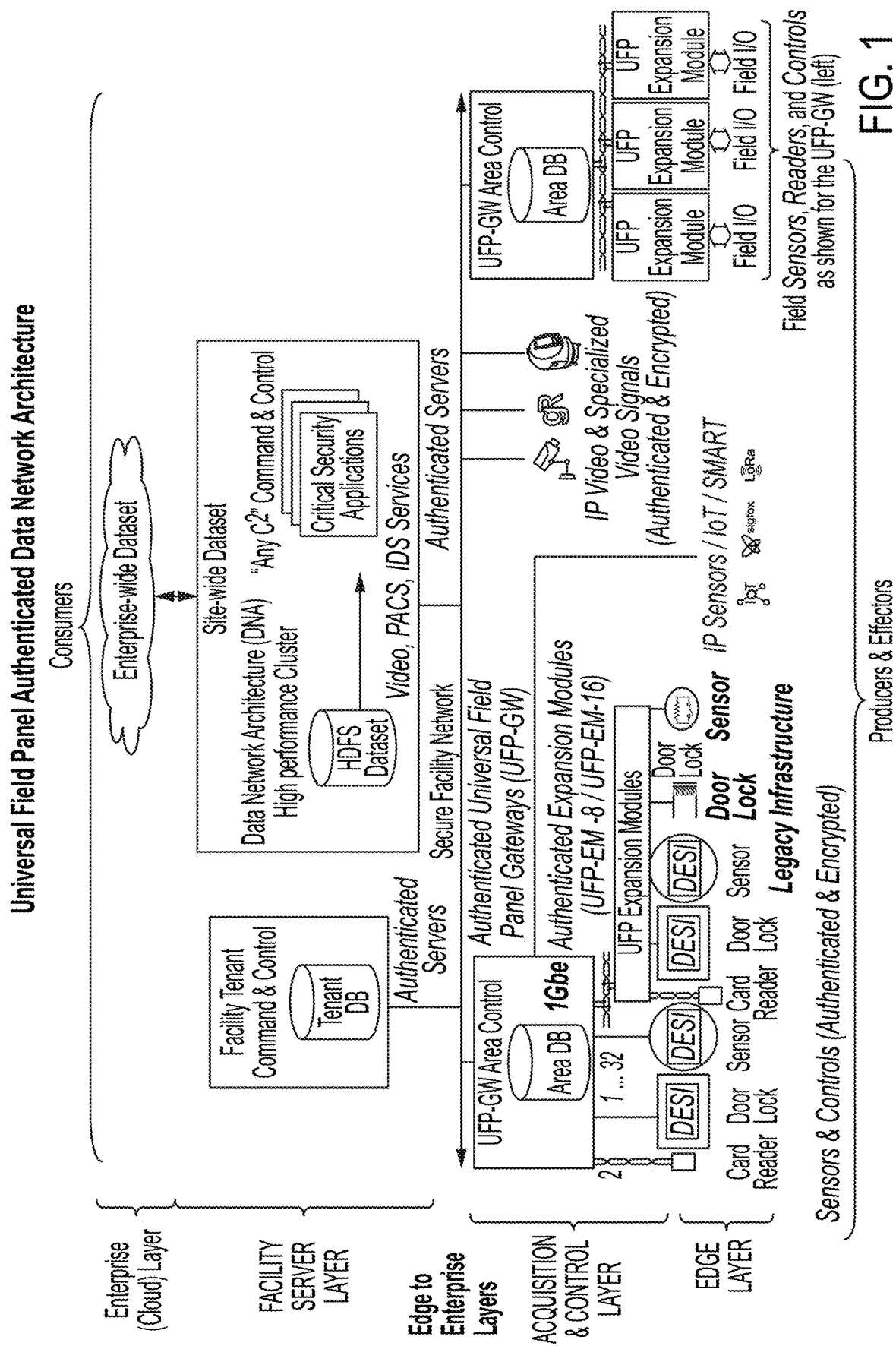
FIG. 1. Functional system block diagram illustrating an example of a system having a top, middle, and edge layer, with development efforts focused on the Edge and Middle layers.
Figure 2:
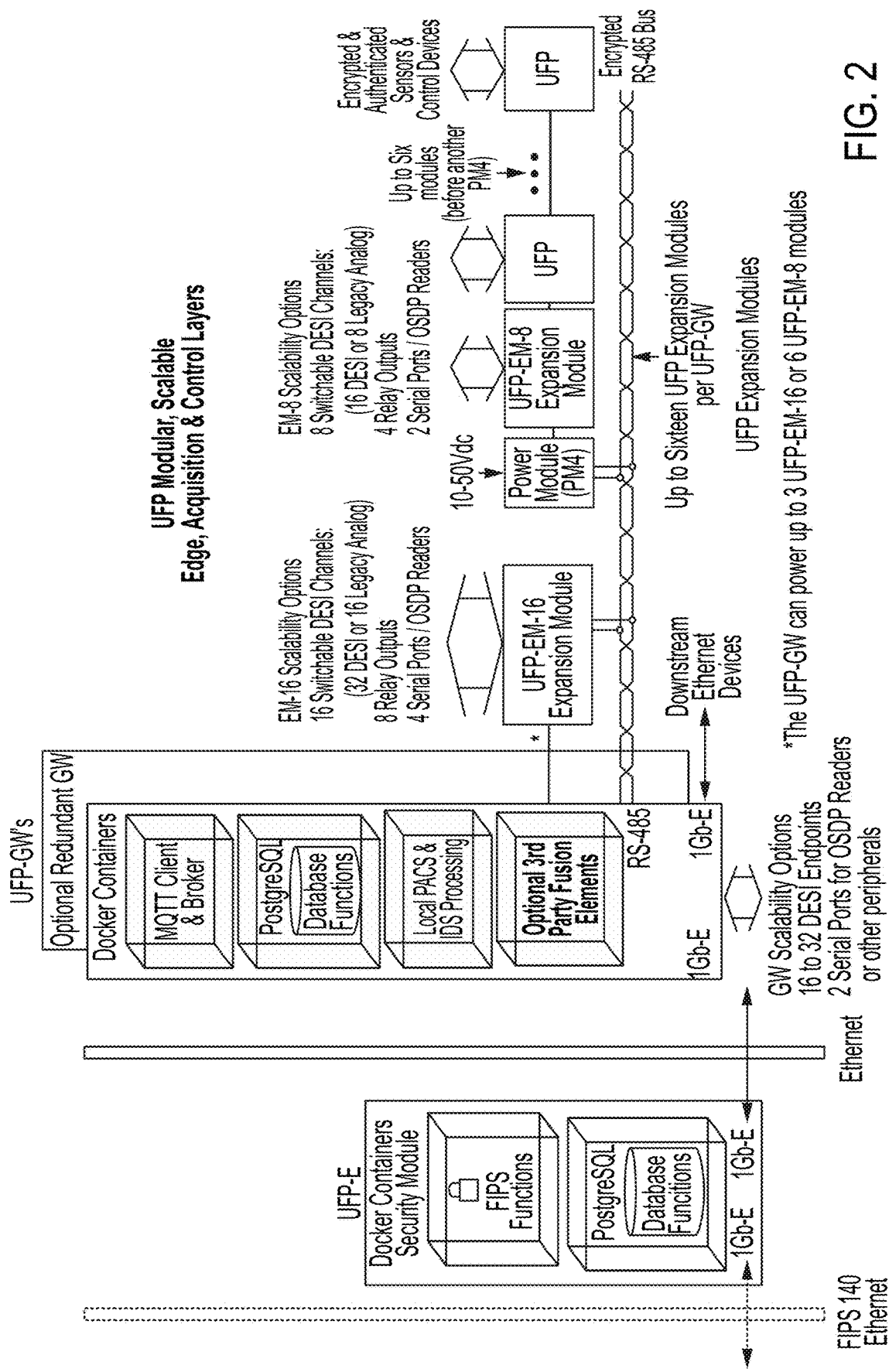
FIG. 2. Illustration of one example of the middle and edge layers of a functional system.

The system will consist of the following layers, some of which are shown in FIG. 1. Apparatus, devices, and systems described herein provide, for example, authentication of passive switch sensors, interface cards, and area controllers in the edge layer to the middle layer. In certain aspects, the system or system components can use an asymmetric keying technology, providing for industry-wide scalability. In other aspects, the edge solution can be applied to the middle to top layers of the system. Ideally, this would use the same methodology as the edge to middle layer.

In certain embodiments systems and devices can comprise one or more processor, circuit board, memory, operating system, debug/programming interface, storage, networking interface, data input/output, and/or power component(s).

Figure 4:
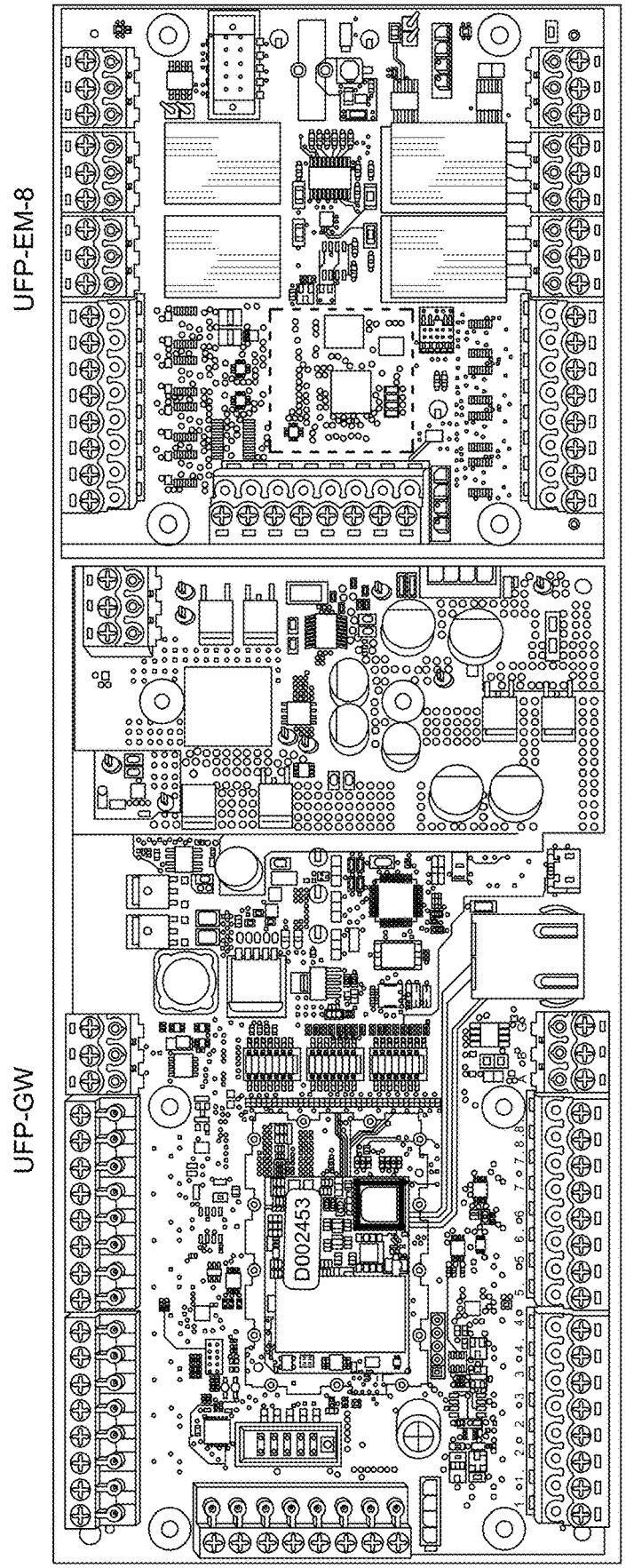
FIG. 4. Illustration of two examples of Universal Field Panels in Universal Field Panel Gateway (UFP-GW w/integral PM-4) and Expansion Module (UFP-EM-8) configurations for the middle layer.
Figure 5:
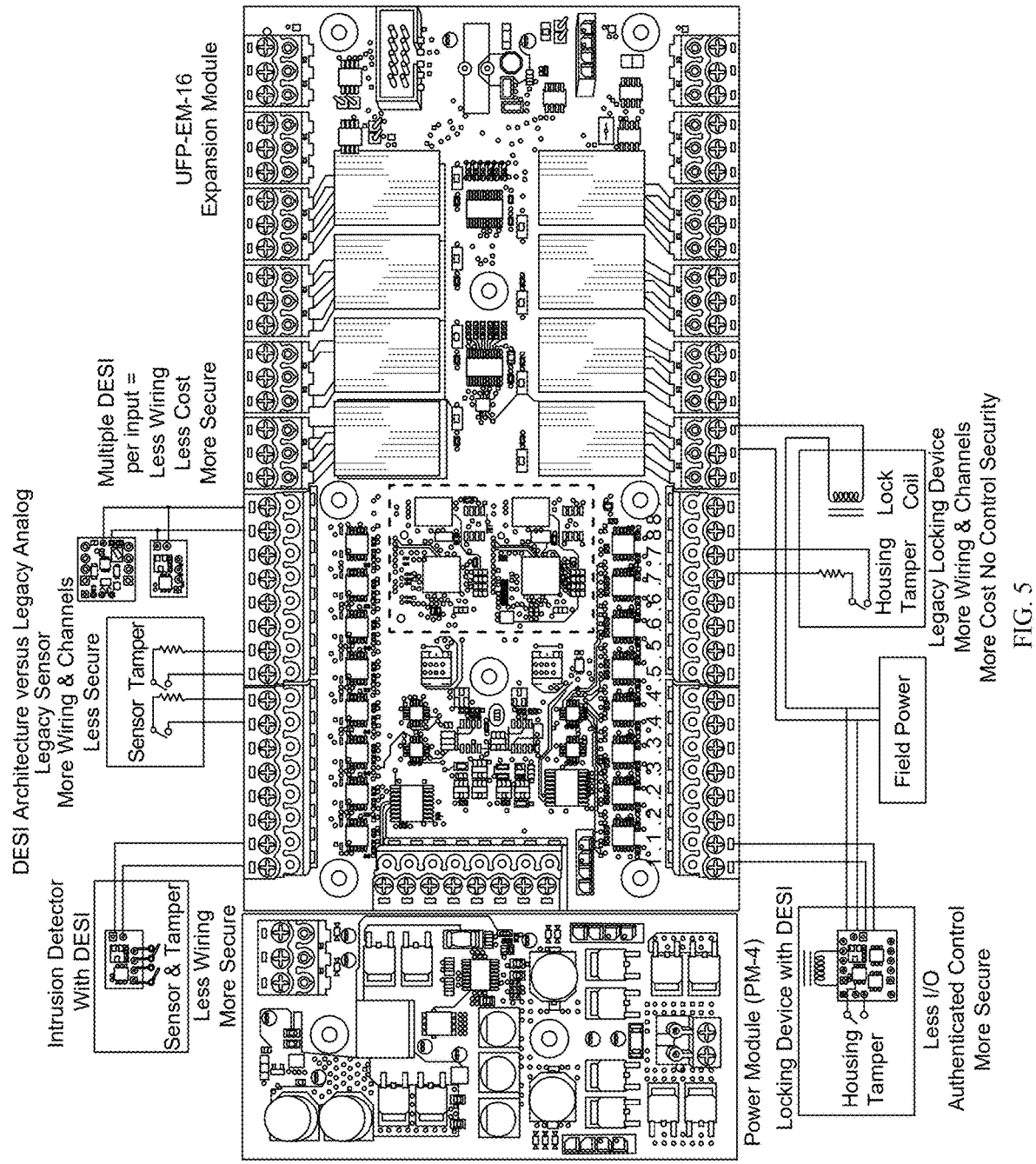
FIG. 5. Illustration and comparison of the two architectures supported by the dual design of the Universal Field Panel channels.
Figure 6:
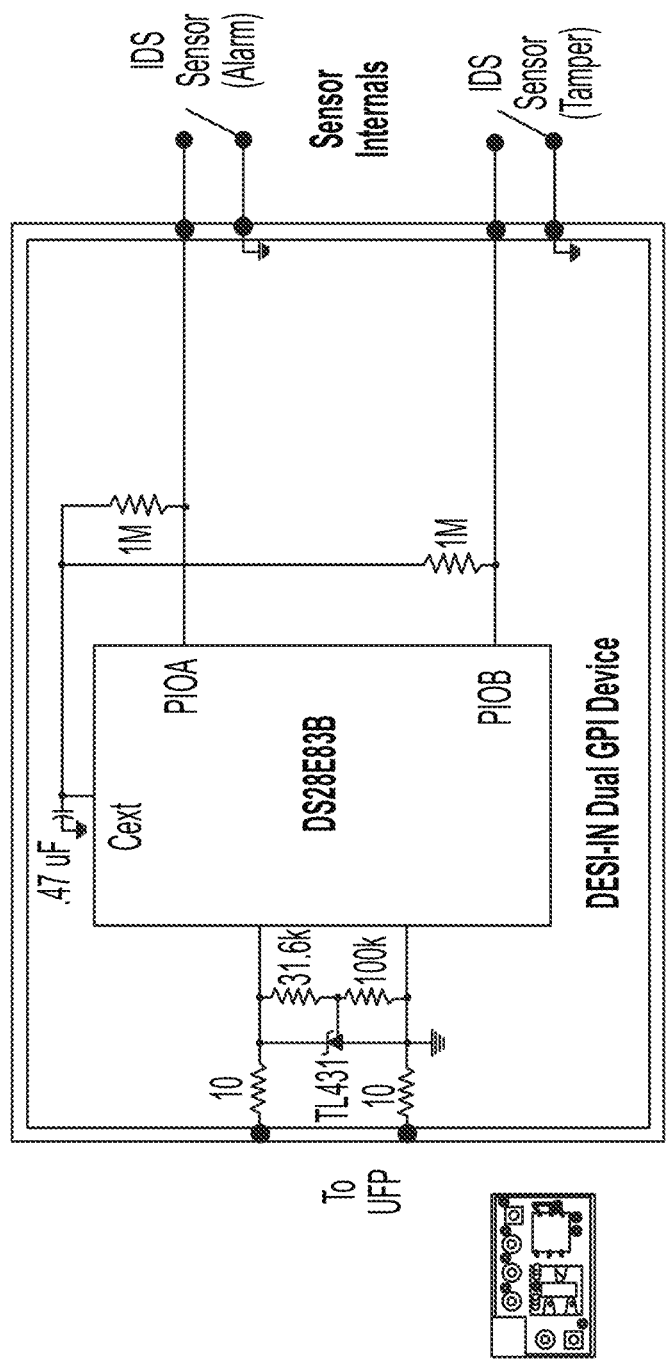
FIG. 6. Illustration of two examples of the DESI variants, one for secure and authenticated sensor inputs and the other for secure and authenticated programmable inputs or control outputs.
Figure 7:
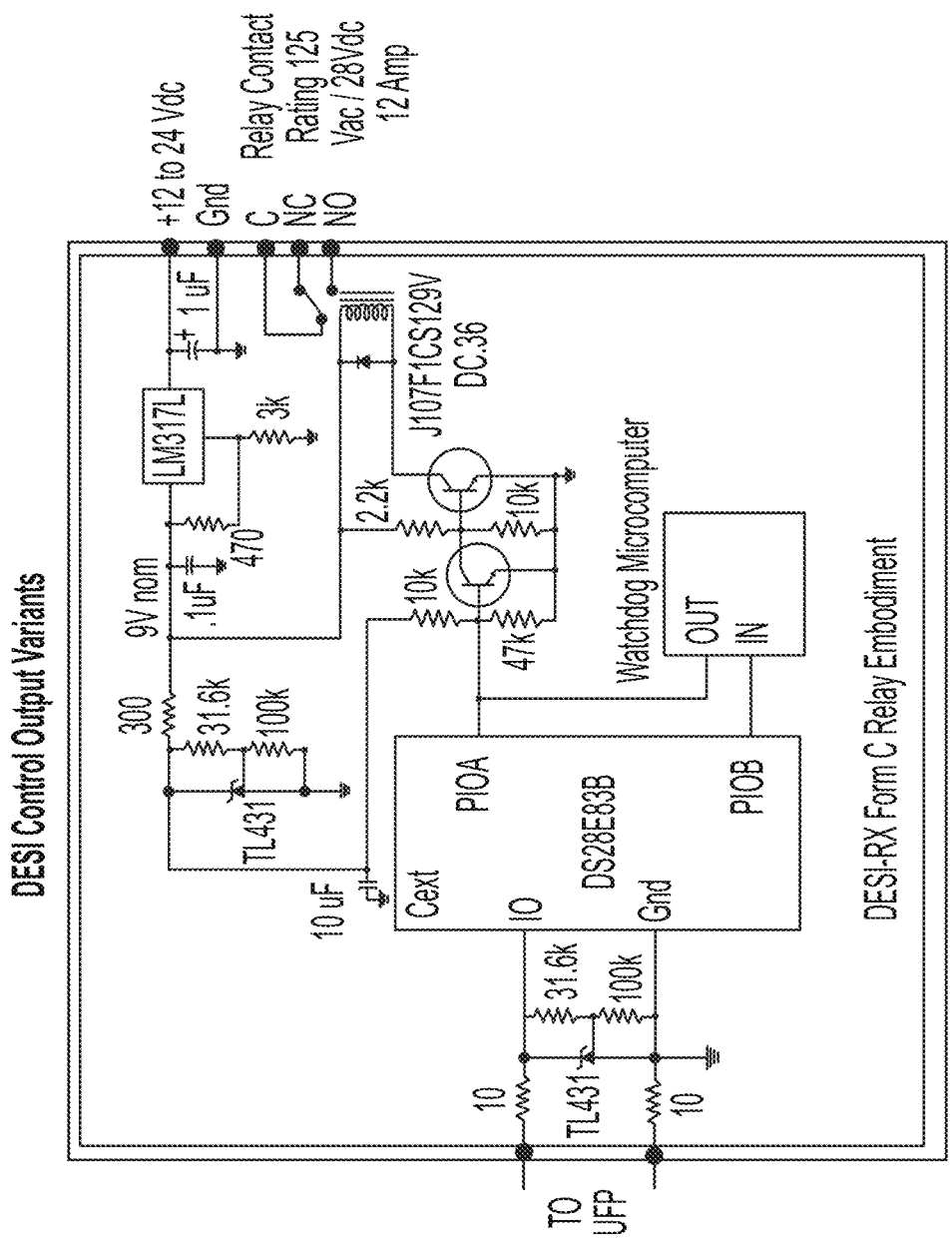
FIG. 7. Illustration of two examples of DESI control output variants for FORM C controls, one for a standard relay the other a solid-state relay.
Figure 7:
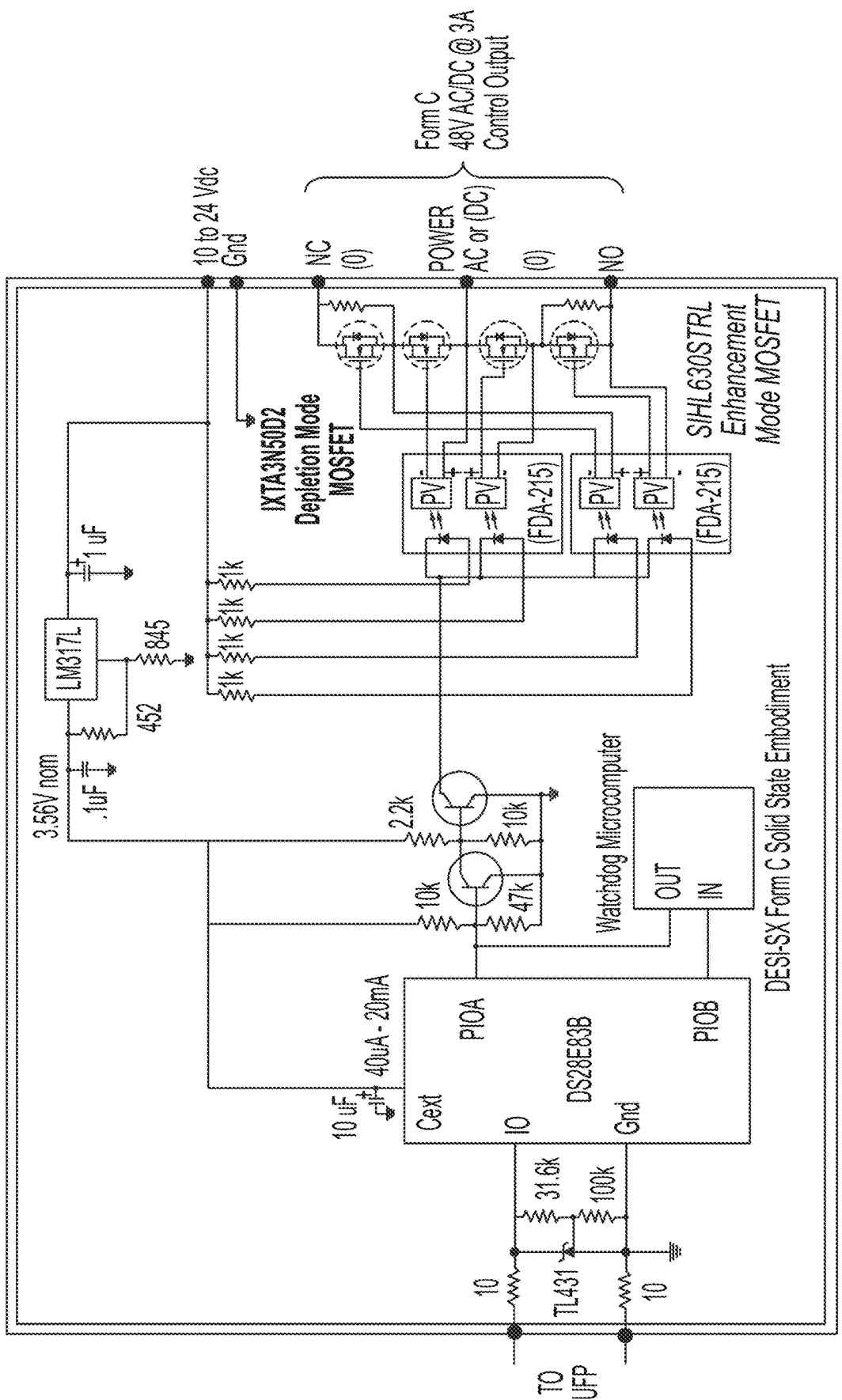

In a representative example, one embodiment can include five hardware modules: an Universal Field Panel Gateway (UFP-GW) daughterboard paired with a compute module system on module (SOM) (such as shown in the configuration of FIG. 4); two Universal Field Panel Expansion Modules (UFP-EM8/UFP-EM16), one power module (PM-4) and one edge Digital Encrypted Security Interface (DESI) module (such as shown in the configuration of FIG. 4 and FIG. 5). The two expansion modules can be a Universal Field PanelUniversal Field PanelUniversal Field Panel Expansion Module 8 (UFP-EM8) and/or Universal Field Panel Expansion Module (UFP-EM-16).

Networking: In certain embodiments, the UFP-GW device can provide for a dual network outputs from the host controller USB 2.0 and Peripheral Control Interface (PCI-E) interfaces. Ports can use a single 8P8C (RJ45) copper twisted pair connector using two twisted pairs. Ports may also support communication with 1000BASE-T, 100 BASE-T and 10BASE-T networks. The UFP-GW devices can be teamed with a pair of devices which can fail over between modules offering redundancy and fault tolerance capabilities.

Figure 3:
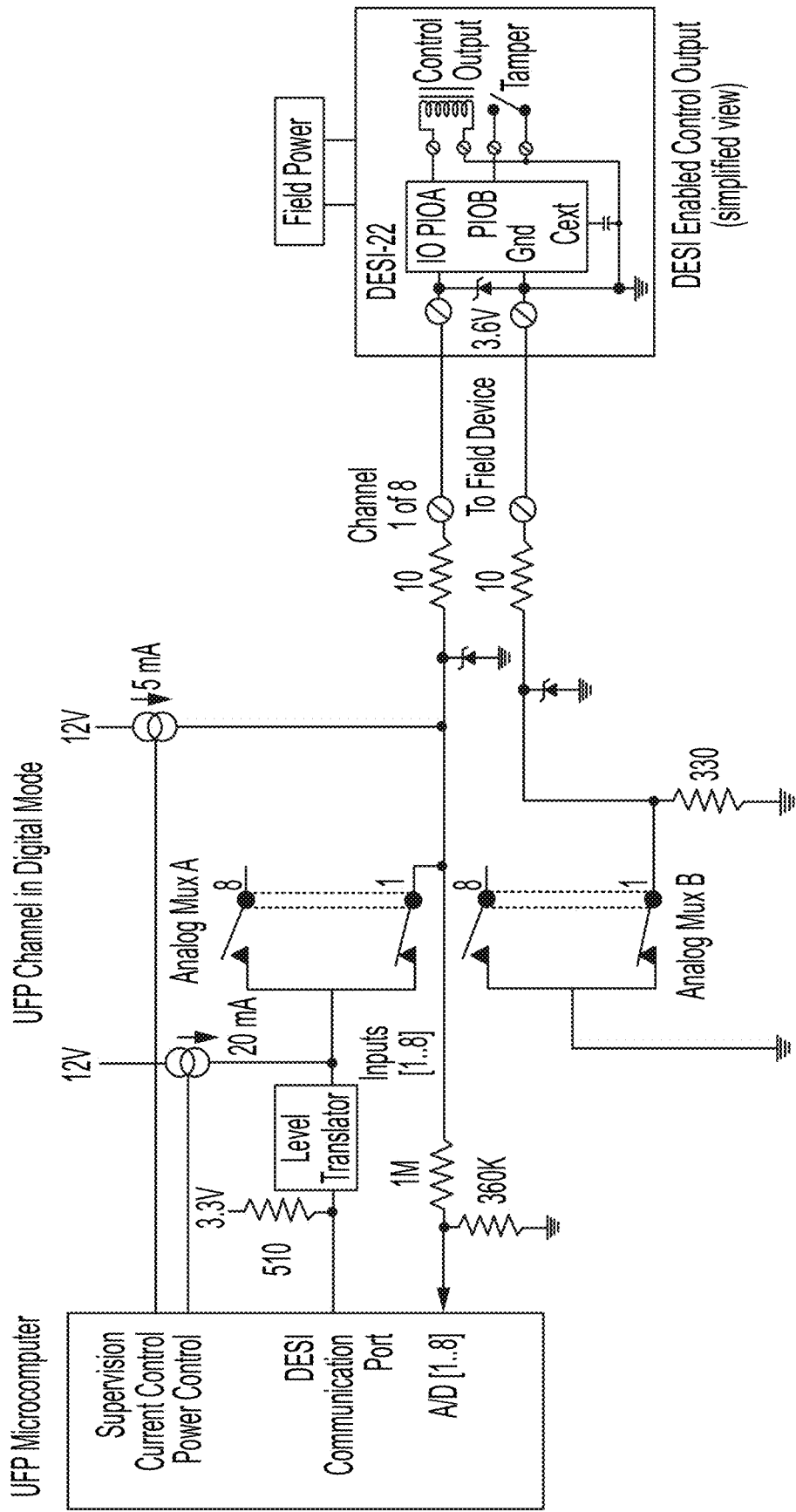
FIG. 3. Illustrates the field selectable dual design traditional analog supervised line technology side by side with the digital encrypted security interface designs for Input acquisition as well as Control Output.
Figure 3:
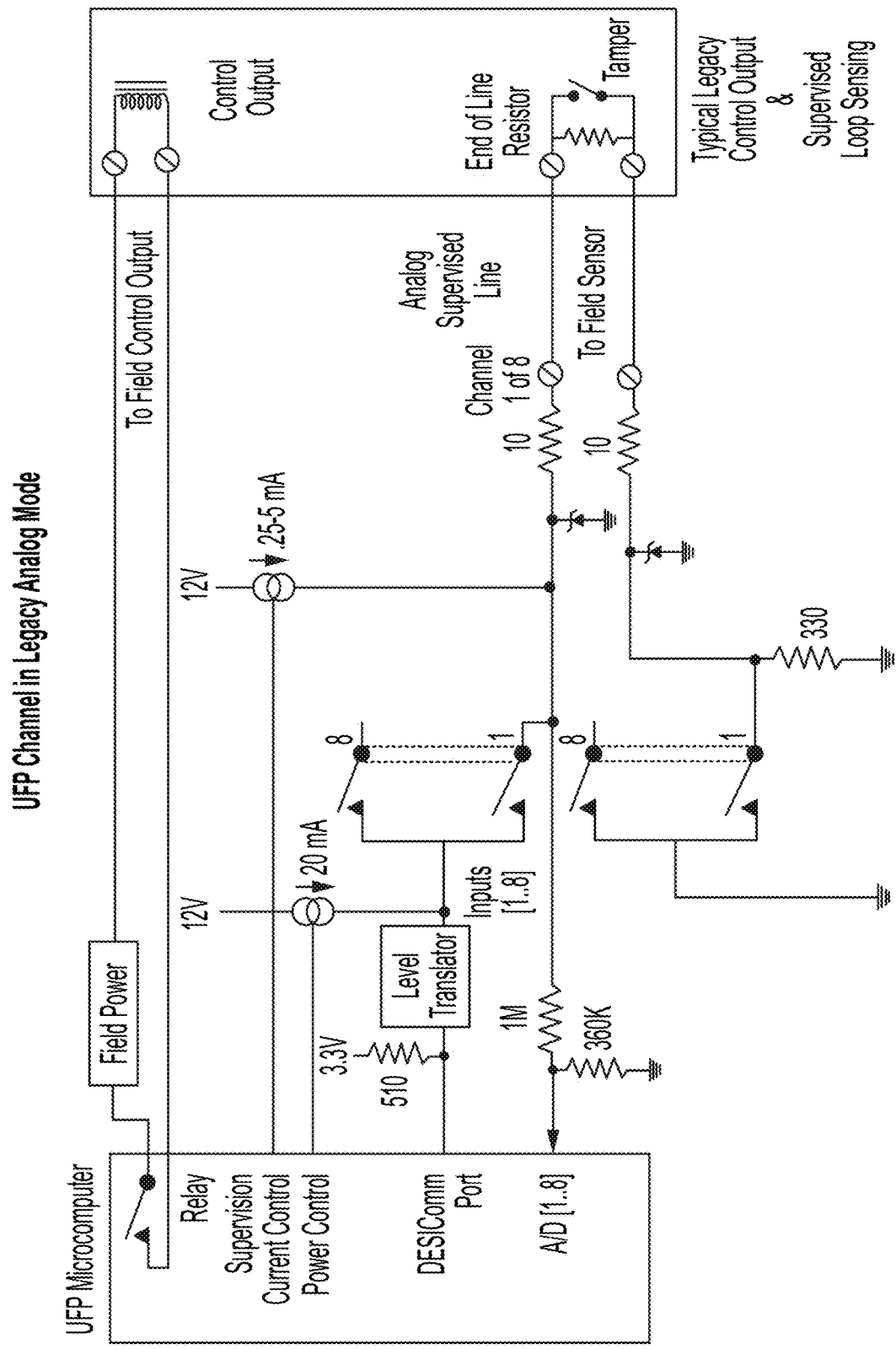

Input/Output (I/O): In certain embodiments, the device can provide all I/O on a removable (Phoenix style) connector. Universal Field Panel channels can be selectable from traditional Analog supervised lines to Digital Encrypted security interfaces (FIG. 3). When used as legacy supervised inputs, the supervision current for each group of four inputs can be set to variable supervision currents ranging from 200 µA to 5 mA using a digitally adjustable current source. In certain aspect the inputs can be set to one of four values: 200 µA, 750 µA, 2.5 mA, 5 mA. In certain aspects, this setting can be via software but, physical jumpers are allowed. Each compute module can provide four single-ended unsupervised I/O lines via a 8 position terminal block. The I/O data direction and edge interrupt characteristics are set via software. The major purpose of this I/O is for native enclosure tamper, and power monitoring. In certain aspects, transient protection may be considered necessary for this I/O. The UFP devices can support legacy Weigand card readers, e.g., in lieu of each RS-485 communications port. Weigand monitoring is via edge interrupt sensing of the Data 0 and Data 1 lines.

Power Input: In certain embodiments, the PM-4 and UFP-GW devices shall accept 10-48V DC for power input. In certain aspects, the devices can provide a daisy-chain cable linkage between modules for power and UFP-GW communication.

In certain aspects, modules can be mounted on an aluminum baseplate to provide adequate support against flexing of the PCB under normal use. The module baseplates can be designed to allow the use of DIN rail support system by Winford.

In certain aspects the device components will be contained in an enclosure; however, enclosure is not required. In certain aspects the enclosure will be a secure enclosure that hinders physical access to the device components. The device enclosure can be constructed for outdoor deployment and resistant to harsh and dirty environments. The device can be configured for use in indoor and outdoor electrical enclosures. Some enclosure may be necessary to achieve EMI/RFI or other requirements. If enclosures are required, the overall electronics enclosure dimensions will be defined by the shape and size of the electronics design. The mechanical design can provide access to the connectors for each of the external interfaces. Modules can be designed in such a way as to minimize the risk of EMI emissions and EMI susceptibility by using component shielding cans where necessary.

A device enclosure will include external indicators, such as LED indicators. In certain embodiments, the apparatus/system can provide multiple LED indicators. In one embodiment the indicator can provide for one or more of an "ON" indicator, an "INITIALIZING" indicator, an "ERROR" indicator, and an "OFF" indicator. One or more indicators can be provided for one or more device functions, including but not limited to the function of the cryptographic engine, application firmware, power, and input/output interface. The LED indicators can automatically transition from state to state based on the execution of logic and give the operator a quick visual indicator of the state of the device. CPU—Each compute module can have a bi-color LED indicator to signal the processor health. Signals include: Off—Inactive, Flashing Green—Nominal, Yellow—Initializing, Red—Error. COMM—The device can provide external LED indicators associated with the communications ports capable of four states and three colors: Off—Inactive, Flashing Green—Nominal reception, Flashing Yellow/Amber—Nominal transmission, Red—Error. POWER—The device can provide a power LED outside of any CPU functions: Power (Blue), No Power (Off). RELAY—Dedicated LED indicators can be applied to each relay output to indicate relay actuation: Actuated (Red), Normal (Off).

In certain aspects the device is constructed to provide protection against environmental factors or provide functionality under such environmental conditions, such as, but not limited to humidity and temperature. The device can be constructed to support industrial operational temperature ranges of −40 to 70 degrees Celsius (including all values and ranges there between) and provide for operation in 10-90% relative humidity, including all values and ranges there between. In a further aspect the device constructed to be stored in relative humidity of 5-95%, including all values and ranges there between.

Firmware and Features Requirements: This section outlines the basic firmware and features of the apparatus/system.

Device Communications and API—There can be a standards-based API served up by the devices. In certain aspects, the apparatus/system configurations and event notification can be accomplished via MQTT (UFP-GW), e.g., via MQTT-SN (UFP-EM). Communications can be secured with TLS or the equivalent.

Low Level Device Drivers—In certain embodiments, the UFP-EM devices shall provide configuration and control over all I/O, e.g., Input type, circuit configuration; Output type, control configuration; Scheduler. In certain aspects, the devices can support over the wire firmware updating.

Console/Terminal Serial Port—In certain embodiments, the UFP modules can implement a serial port for use as a local console or terminal interface to the main processor during software development. Port may use logic level signaling in place of RS232 level signaling. Port will support a data rate up to a 115,200 baud. In certain aspects, Port may implement hardware flow control signals.

Multi-Format Serial Ports—In certain embodiments, the system will include multiple multi-format serial port for communication with external devices. A port can support RS232, RS485, and RS422 electrical signal standards. In addition, these ports can be monitored for Weigand reader use in lieu of serial communications. In a further aspect, only one format (RS232, RS485, RS422, Weigand) can be active at any one time. A dedicated signal ground can be present and can be used with all formats. The RS232 format may be required to implement hardware flow control. No modifications to the PCB, including signal jumpers or switches, should be required to configure the port for a specific electrical format. RS-422 communications may be accomplished by using two RS-485 ports and configuring on for Rx only and the other for Tx only. RS232 communication can support a data rate up to a 115,200 baud. RS422 and RS485 communication may support a data rate up to a 115,200 baud. RS-232 signals can be exposed via a 10-pin header which will interface with an external DE-9 insulation displacement connecter and associated ribbon cable and mating socket.

Encryption: In certain embodiments, each edge layer module and middle layer area controller can contain a secure chip which provides FISP-186 ECDSA P256 challenge/response-based implementation. These chips may also provide a NIST 800-90B compliant entropy source via a TRNG. In certain aspects, each module with inputs would offer the additional protection of FIPS-186 ECDSA P256 at the end of line input pickup for traditional Boolean sensors. The end of line input authentication modules may perform ECDH key exchange and would be authenticated to their Edge Module only. In certain aspects, the end of line Digital Encrypted Security Interface module would additionally encrypt the GPIO messages using HMAC. UFP-EM Module to UFP-GW Area Controller communications can all be encrypted using HTTPS/TLS. Area Controller communications to Enterprise can also occur using a HTTPS/TLS implementation. Session encryption key (AES128/AES256/3DES) with HMAC-SHA256 for Session Authentication Key and RSA-3072 key transfer via TLS_DHE_RSA_WITH_AES_256_CBC_SHA.

In certain aspects the system/device can be configured to provide for a software program for decryption that can be installed on Windows client or Server versions, Linux, be capable of easy integration into a Java environments (Java Virtual Machine), a software program that includes definition of an API for use in integrating all data outputs from the software module into other applications (e.g., the API shall define all functions in a manual, and provide sample applications and sample code.)

Regulatory and Standards Requirements: In certain instances, the devices and design shall conform to the following UL/safety standards and successfully obtain the markings: UL-294, UL-1076, UL-60950. The cryptography implementations as well as supporting libraries and functions (like RNG for example) can be NIST compliant and FIPS certified. In certain embodiments, the devices shall comply with 47 CFR FCC Part 15, sub part B, Class B. The externally accessible signals can be designed to withstand electrostatic discharge testing to IEC 61000-4-2, Level 1 standards for both HBM air and contact type discharge. In other aspects, the devices can be RoHS compliant.

The system/device/apparatus can comprise one or more firmware components or features. In certain aspects device configurations can be accomplished via a secure web page served up by the device or remotely managed by a secure command and control system via the platform API.

In certain aspects the system/device can be configured to provide support for 128-bit and 256-bit AES standards, implement all security features of the processor including High Assurance Boot, Trusted Platform Module (TPM2.0), Secure RTC, NIST certified RNG and zeroizable memory based on intrusion. In certain aspects the firmware used for crypto functions must be segmented from rest of application space so that continued development can occur around the crypto engine while maintaining certification integrity, i.e., providing a crypto boundary.

A system includes one or more processors coupled to a system memory via an input/output (I/O) interface. A system further includes a network interface coupled to I/O interface, and one or more input/output devices, such as a monitoring device, a cursor control device, a keyboard, a display(s) and the like. In certain embodiments multiple devices make up the system and each device may be configured to host different portions or instances of embodiments or functions of the system. For example, some elements may be implemented via one or more devices of the system that are distinct from those devices implementing other elements. The input/output devices may, in some embodiments, include one or more display terminals, keyboards, keypads, touch screens, scanning devices, voice or optical recognition devices, or any other devices suitable for entering or retrieving data by one or more systems. Multiple input/output devices may be present in a system or may be distributed on various nodes of the system. In some embodiments, similar input/output devices may be separate from the system and may interact with one or more nodes of the system through a wired or wireless connection, such as over a network interface.

In various embodiments, a system may be a multi-processor system including two or more processors (e.g., two, four, eight, or another suitable number). The processors may be any processor capable of executing program instructions. For example, in various embodiments, processors may be general-purpose or embedded processors implementing any of a variety of instruction set architectures (ISAs), such as the x86, POWERPC®, ARM®, SPARC®, or MIPS® RTOS, ISAs, or any other suitable ISA. In multi-processor systems, each of processors may commonly, but not necessarily, implement the same ISA. Also, in some embodiments, at least one processor may be a graphics-processing unit (GPU) or other dedicated graphics-rendering device.

System memory may be configured to store program instructions and/or data accessible by one or more processors. In various embodiments, the system memory may be implemented using any suitable memory technology, such as static random-access memory (SRAM), synchronous dynamic RAM (SDRAM), nonvolatile/Flash-type memory, or any other type of memory. Program instructions and data implementing certain operations, such as, for example, those described herein, may be stored within system memory as program instructions and data storage, respectively. In other embodiments, program instructions and/or data may be received, sent or stored upon different types of computer-accessible media or on similar media separate from system memory or computer system. Generally speaking, a computer-accessible medium may include any tangible storage media or memory media such as magnetic or optical media—e.g., disk or CD/DVD-ROM coupled to computer system via I/O interface. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via a network interface.

In certain embodiments, an I/O interface may be configured to coordinate I/O traffic between processor, system memory, and any peripheral devices, including network interface or other peripheral interfaces, such as input/output devices. In some embodiments, an I/O interface may perform any necessary protocol, timing or other data transformations to convert data signals from one component (e.g., system memory) into a format suitable for use by another component (e.g., processor). In some embodiments, an I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all the functionality of an I/O interface, such as an interface to system memory, may be incorporated directly into a processor.

A network interface may be configured to allow data to be exchanged between a system and other devices on a network, such as other computer systems, other devices, or between nodes of a computer system. In various embodiments, a network interface may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Memory may include program instructions, configured to implement certain embodiments described herein, and data storage, comprising various data accessible by program instructions. In certain embodiments, program instructions may include software elements of embodiments described herein. For example, the program instructions may be implemented in various embodiments using any desired programming language, scripting language, or combination of programming languages and/or scripting languages (e.g., C, C++, C#, JAVA®, JAVASCRIPT®, PERL®, etc.). Data storage may include data that may be used in these embodiments. Other or different software elements and data may be included.

A person of ordinary skill in the art will appreciate that the system and method described herein are merely illustrative and is not intended to limit the scope of the disclosure. In particular, the system and devices may include any combination of hardware or software that can perform the indicated operations. In addition, the operations performed by the components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other system configurations.

The examples provided herein, as well as the figures, are included to demonstrate certain embodiments of the invention. It should be appreciated by those of skill in the art that the systems, devices, methods, and techniques disclosed in the examples or figures represent those identified by the inventors to function well in the practice of the invention, and thus can be considered to constitute modes for its practice. However, those of skill in the art should, in light of the present disclosure, appreciate that many changes can be made in the specific embodiments which are disclosed and still obtain a like or similar result without departing from the spirit and scope of the invention.

The invention claimed is:

1. A digital encrypted security interface (DESI) device, comprising:
   at least one sensor input where the DESI is configured to authenticate sensor input;
   at least one control output where the DESI is configured to authenticate and/or encrypt a command signal; and
   a microcontroller configured as a DESI controller, wherein the microcontroller is configured to (i) couple to at least one edge layer sensor through the at least one sensor input and (ii) authenticate the at least one edge layer sensor,
   wherein the DESI device is configured to be installed in an edge layer of a security system and couple to a Universal Field Panel (UFP).

2. The device of claim 1, wherein the at least one edge layer sensor is a digital sensor, and wherein the digital sensor comprises a digital sensor module configured to receive a Boolean signal.

3. The device of claim 1, wherein the at least one edge layer sensor is an analog sensor that generates an analog signal.

4. The device of claim 1, wherein the microcontroller is configured to authenticate the at least one edge layer sensor using a public key cryptography digital signature authentication mechanism and a public key cryptography encryption algorithm.

5. The device of claim 4, wherein the public key cryptography digital signature authentication mechanism comprises Elliptic Curve Digital Signature Algorithm (ECDSA).

6. The device of claim 5, wherein the public key cryptography encryption comprises a hash message authentication code (HMAC).

* * * * *